(12) United States Patent
Hurlin et al.

(10) Patent No.: US 8,899,013 B2
(45) Date of Patent: *Dec. 2, 2014

(54) THRUST REVERSER HAVING LOCKING/UNLOCKING CASCADE VANES

(71) Applicants: Aircelle, Gonfreville l'Orcher (FR); Snecma, Paris (FR)

(72) Inventors: Herve Hurlin, Igny (FR); Nicolas Dezeustre, Le Havre (FR); Wouter Balk, Melun (FR); Bertrand Desjoyeaux, Sainte Adresse (FR)

(73) Assignees: Aircelle, Gonfreville l'Orcher (FR); Snecma, General Martial Valin (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,947

(22) Filed: Apr. 3, 2013

(65) Prior Publication Data

US 2013/0280031 A1 Oct. 24, 2013

Related U.S. Application Data

(63) Continuation of application No. PCT/FR2011/052308, filed on Oct. 4, 2011.

(30) Foreign Application Priority Data

Oct. 4, 2010 (FR) ..................................... 10 57999

(51) Int. Cl.
*F01D 25/24* (2006.01)
*F02K 1/76* (2006.01)
*F02K 1/72* (2006.01)
*F02K 1/60* (2006.01)
*F01D 5/00* (2006.01)
*F02K 1/62* (2006.01)

(52) U.S. Cl.
CPC ............... *F01D 25/24* (2013.01); *Y02T 50/672* (2013.01); *F02K 1/605* (2013.01); *F01D 5/005* (2013.01); *F05D 2240/14* (2013.01); *F02K 1/625* (2013.01); *Y02T 50/673* (2013.01); *F02K 1/72* (2013.01); *F05D 2230/80* (2013.01); *F02K 1/766* (2013.01)
USPC ...................................... 60/226.2; 244/110 B

(58) Field of Classification Search
CPC ........... F02K 1/766; F02K 1/605; F02K 1/72; F02K 1/625; F01D 25/24; F01D 5/005; F05D 2230/80; F05D 2240/14; Y02T 50/672; Y02T 50/673
USPC .......... 60/226.2, 230; 244/110 B; 239/265.19
See application file for complete search history.

(56) References Cited

U.S. PATENT DOCUMENTS

| 6,915,984 B2 * | 7/2005 | Sternberger et al. ...... 244/110 B |
| 2006/0005530 A1 * | 1/2006 | Blin et al. .................... 60/226.2 |

(Continued)

FOREIGN PATENT DOCUMENTS

| EP | 0853192 A1 | 7/1998 |
| EP | 1457659 A2 | 9/2004 |

(Continued)

*Primary Examiner* — William H Rodriguez
*Assistant Examiner* — Carlos A Rivera
(74) *Attorney, Agent, or Firm* — Brinks Gilson & Lione

(57) ABSTRACT

A thrust reverser for the nacelle of a turboreactor includes at least one fixed front frame that can be mounted downstream of a fan casing of the turboreactor and directly or indirectly supports at least one flow deviation vanes, in which at least part of the flow deviation vanes can be detached from the front frame and moved in translation independently therefrom when a maintenance operation is being carried out on the reverser.

6 Claims, 4 Drawing Sheets

(56) References Cited

U.S. PATENT DOCUMENTS

2006/0145001 A1    7/2006  Smith
2009/0151320 A1    6/2009  Sternberger
2013/0277454 A1*  10/2013  Hurlin et al. ............ 239/265.19

FOREIGN PATENT DOCUMENTS

| EP | 2138697 | A2 | 12/2009 |
| FR | 2911372 |    | 1/2007  |
| FR | 2912378 |    | 2/2007  |

* cited by examiner

THRUST REVERSER HAVING
LOCKING/UNLOCKING CASCADE VANES

CROSS-REFERENCE TO RELATED APPLICATIONS

This application is a continuation of International Application No. PCT/FR2011/052308 filed on Oct. 4, 2011, which claims the benefit of FR 10/57999, filed on Oct. 4, 2010. The disclosures of the above applications are incorporated herein by reference.

FIELD

The present disclosure relates to a thrust reverser for an aircraft engine assembly.

BACKGROUND

The statements in this section merely provide background information related to the present disclosure and may not constitute prior art.

An aircraft propulsion assembly is made up of a nacelle and a turbojet engine and is designed to be suspended from a fixed structure of the aircraft, for example under a wing or in the fuselage, by means of a suspension mast attached to the turbojet engine or the nacelle.

The turbojet engine typically includes a so-called "upstream" section comprising a fan provided with vanes, and a so-called "downstream" section housing a gas generator.

The vanes of the fan are surrounded by a case making it possible to mount said turbojet engine in the nacelle.

The nacelle has a generally tubular shape comprising an air inlet upstream of the turbojet engine, a middle section designed to surround the fan of the turbojet engine, and a downstream section housing thrust reverser means and designed to surround the gas generator of the turbojet engine. A gas jet nozzle may extend the thrust reverser means in the downstream direction.

The thrust reverser means make it possible to improve the braking capacity of the aircraft by reorienting at least part of the thrust generated by the turbojet engine forward. In the reverse jet position, the thrust reverser means obstruct the gas jet nozzle and orient the discharge flow from the engine toward the front of the nacelle, thereby generating a counter-thrust that is added to the braking of the wheels of the aircraft.

A common thrust reverser means structure comprises a cowl in which an opening is formed designed for the deviated flow, which, in the direct thrust situation of the gases, is closed by the sliding cowl and, in the thrust reversal situation, is released by downstream translation (relative to the direction of flow of the gases) of the sliding cowl, by means of displacement cylinders, said displacement cylinders being mounted on the front frame upstream of the opening.

The sliding cowl is most often made up of two half-cowls, with a substantially semi-cylindrical shape, which are hinged in the upper portion on hinges parallel to the direction of translation of the sliding cowl, and which are closed by bolts in the lower portion.

This arrangement makes it possible, for maintenance operations, to access the inside of the nacelle, and in particular the turbojet engine or an inner structure of the reverser by opening said half-cowls.

In order to resolve certain problems related to a "butterfly" opening, translational opening has also been developed.

In any case, this nacelle structure housing the thrust reverser device undergoes axial aerodynamic forces during flight that tend to cause the structure to withdraw relative to the engine.

So as not to place these forces only on the fastening points of the thrust reverser to a mast, the front frame is connected to the structure of the turbojet engine, and more specifically to the fan case. The connection is traditionally done using a blade/groove system, the male blade portion generally being supported by the front frame, while the female groove portion is supported by the fan case.

Another possible thrust reverser structure comprises an outer assembly in a single piece with no break in the lower portion. Such a structure is called an O structure.

During maintenance operations, in particular in an O thrust reverser structure, it is known to access the inside of the nacelle, and in particular the turbojet engine or an inner structure of the reverser, by separating the outer structure of the downstream section from the nacelle of the concentric inner structure thereof and to translate the outer structure in the downstream direction, in which it simply releases the reverser cascades, so as to allow access to the engine body.

In said O structure, the maintenance between the middle section of the engine and the front frame is done by two female portions generally supported by the front frame and a so-called intermediate case of the middle section, cooperating with an intermediate piece that closes on the female portion, thereby providing the connection between the intermediate case and the front frame of the reverser.

Irrespective of the selected maintenance access mode, C structure or O structure, the cascade vanes still limit access to the heart of the nacelle. It is therefore necessary to retract them if one wishes to provide free access to the heart of the nacelle.

To that end, certain technological embodiments are known based on the disassembly of the cascades to access the cowl surrounding the engine body. Then, the turbojet engine is accessible either due to the presence of hatches, or by disassembling certain portions of the cowl.

Another alternative consists of installing the cascades on a moving front frame. During maintenance operations, the front frame is separated from the intermediate case and the assembly of the sliding cowl, front frame and cascade vanes is translated downstream of the nacelle to provide access to the engine body.

Irrespective of the selected maintenance access mode, such manipulations are lengthy, difficult, and involve installing separating elements in areas that undergo significant structural stresses. Access to the engine is also tedious.

SUMMARY

The present disclosure provides a thrust reverser that is easy to implement and use during maintenance operations.

To that end, the disclosure relates to a thrust reverser for a turbojet engine nacelle comprising at least one fixed front frame suitable for being mounted downstream of a fan case of said turbojet engine and directly or indirectly supporting at least one flow deviating means i.e., cascade vanes, which in one form at least part of the flow deviating means is detachable from the front frame and can be translated independently therefrom when a maintenance operation is being carried out on said assembly.

This offers the advantage of eliminating any deposition of deviation means during maintenance operations and accelerates said operations.

Advantageously, the flow deviating means and the front frame comprise complementary locking/unlocking means suitable for engaging the flow deviating means with the front frame in the reverse jet situation and detaching the flow deviating means from the front frame during maintenance of said assembly, thereby favoring an optimal connection between the front frame and the deviation means in the reverse jet situation in particular, and easy to detach during maintenance operations.

Advantageously, downstream of the front frame, the reverser comprises an outer cowl translatably mounted along a substantially longitudinal axis of the nacelle, said cowl being suitable for translating the flow deviating means during a maintenance operation once the flow deviating means are detached.

This offers the advantage of simplifying the additional devices necessary for maintenance operations.

In one form, the thrust reverser comprises one or more actuators designed to translate the cowl along a substantially longitudinal axis of the nacelle downstream of the front frame toward at least one thrust reversal position, said cowl being suitable for translating one or more actuators during a maintenance operation, this making it possible to offer greater access during maintenance of the assembly.

In one alternative form, the fixed front frame is designed to be mounted downstream of an outer shroud of an intermediate case using a male/female system of the blade/groove type.

In another alternative form, the fixed front frame is designed to be mounted downstream of an outer shroud of an intermediate case, said front frame comprising a deviating edge and an element directly or indirectly forming a support for the flow deviating means, the deviating edge and said support-forming element being incorporated into the outer shroud of the intermediate case. The interface between the front frame and the intermediate case is thus simplified inasmuch as any disassemble connection between the two elements is eliminated.

Furthermore, the decrease in the number of parts at that interface makes it possible to reduce the mass of the nacelle and the associated production costs, and to reduce the length thereof.

Furthermore, all play is eliminated between the front frame and the intermediate case, thereby favoring better aerodynamic performance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
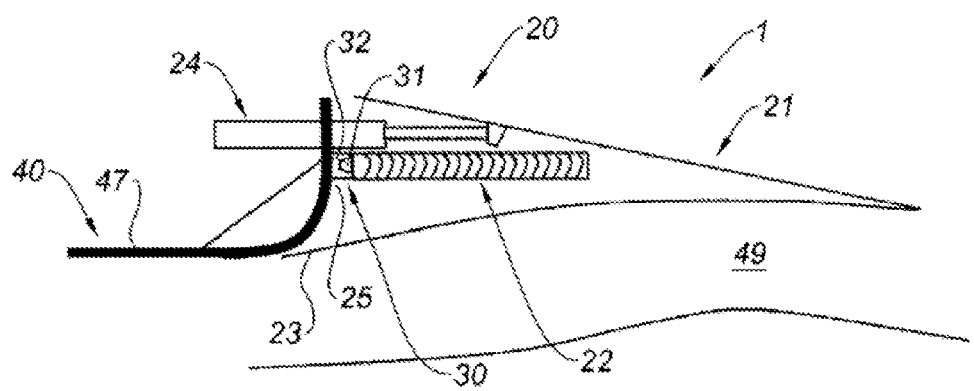
FIG. 3 is a diagrammatic cross-sectional view of a thrust reversal device equipping the nacelle of FIG. 2 according to a first embodiment of the present disclosure.
Figure 4:
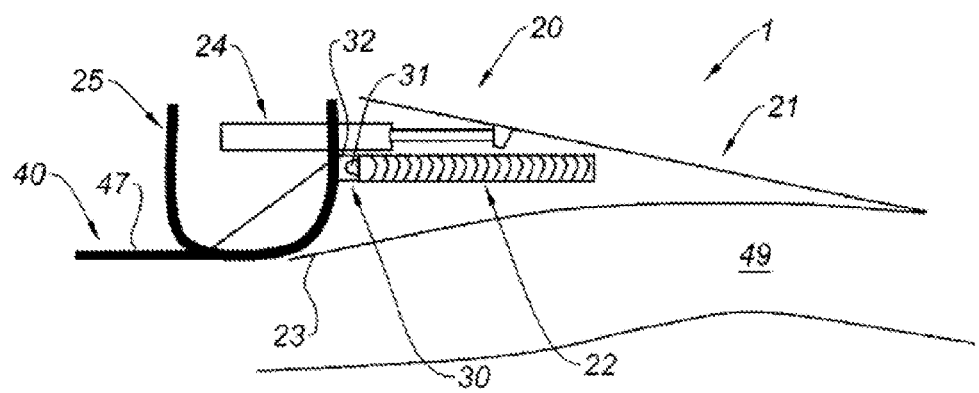
FIG. 4 is a diagrammatic cross-sectional view of a thrust reversal device equipping the nacelle of FIG. 2 according to a second embodiment of the present disclosure.
Figure 5:
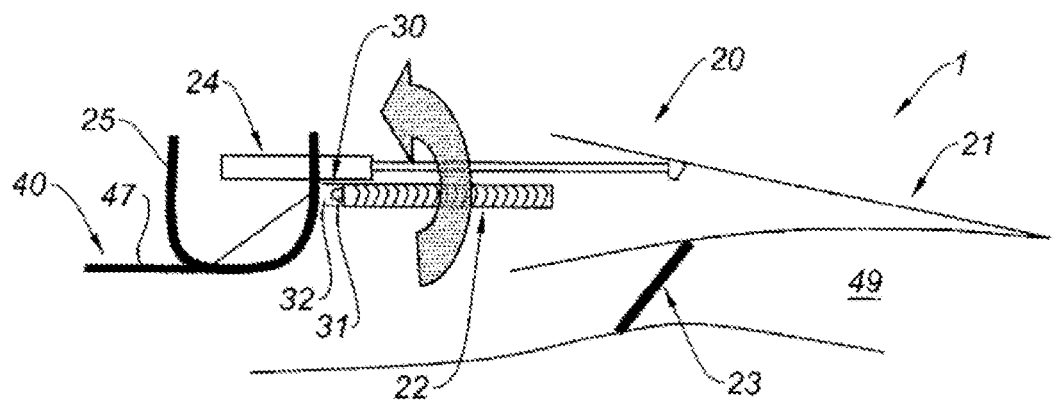
Figure 6:
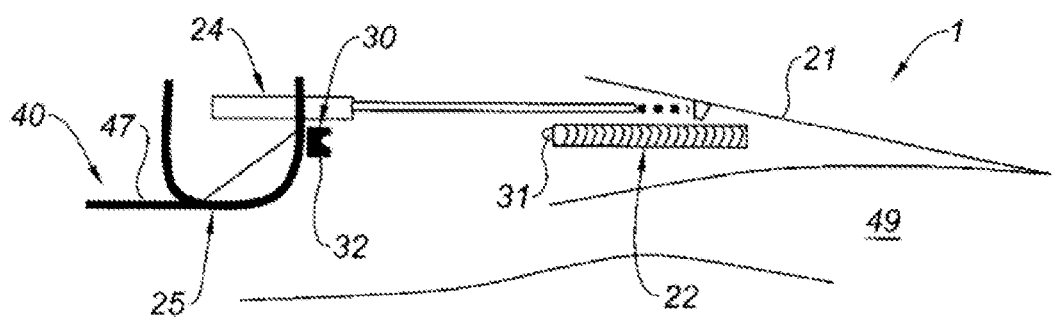
Figure 7:
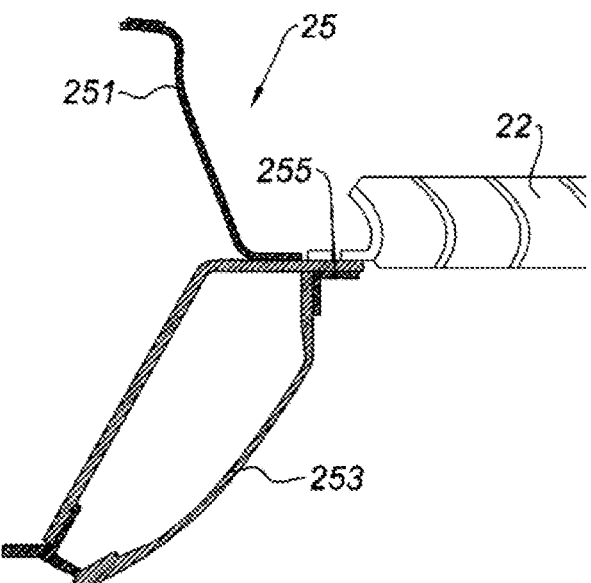
Figure 8:
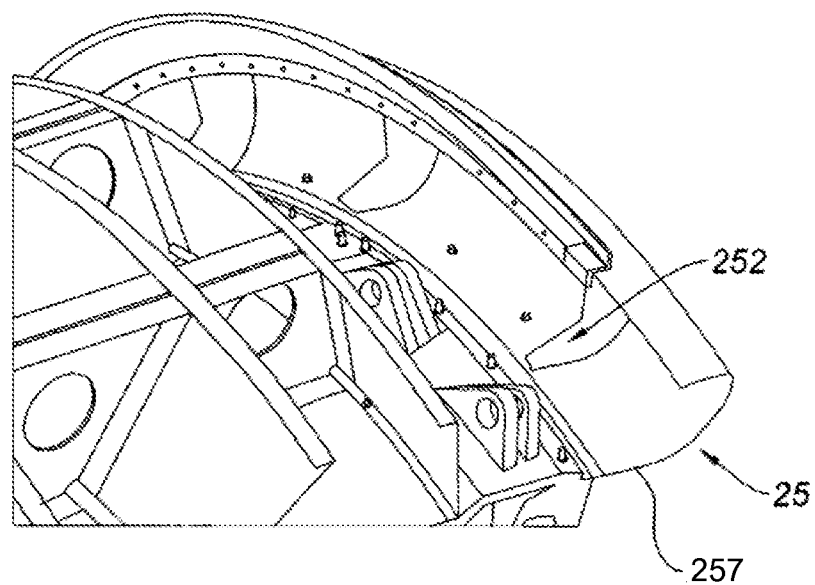

FIGS. 5 and 6 are cross-sectional views of the thrust reversal device of FIG. 3 having a thrust reversal cowl translated in the downstream direction, in the reversed jet position and the maintenance position, respectively; and FIGS. 7 and 8 are longitudinal cross-sectional and perspective views, respectively, of first and second alternative embodiments of a front frame of the thrust reversal device of FIGS. 3 to 6.

In all of these figures, identical or similar references designate identical or similar members or sets of members.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
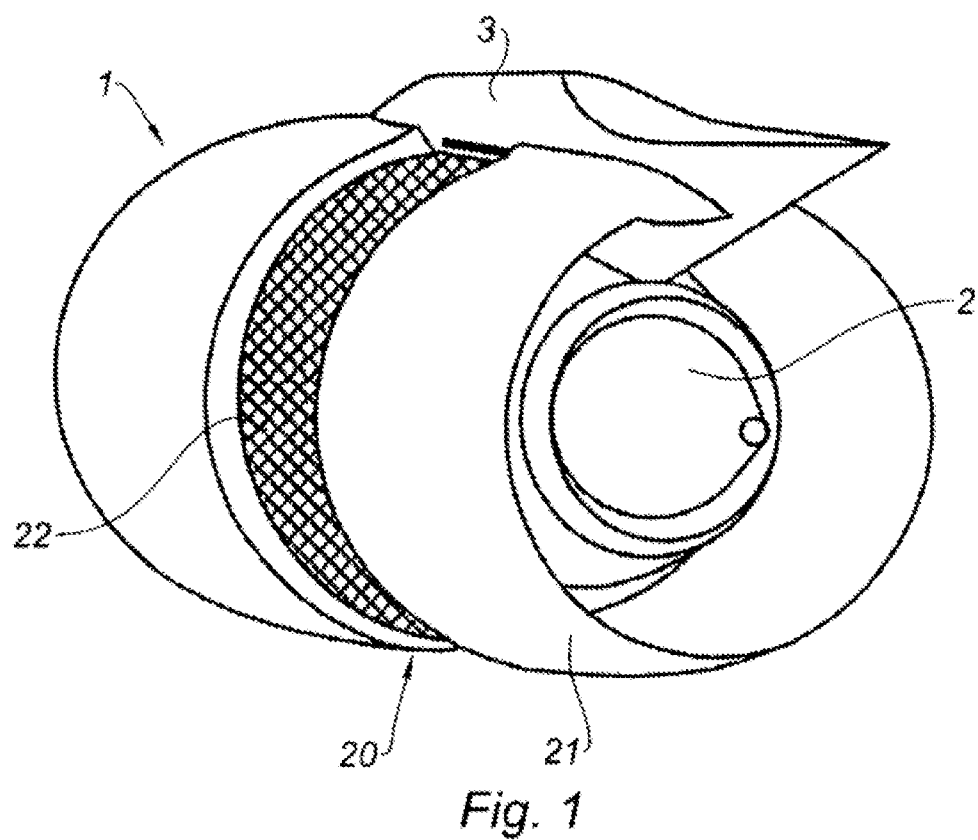
FIG. 1 is a partial diagrammatic illustration of an aircraft propulsion assembly comprising a turbojet engine nacelle comprising a downstream grid thrust reverser structure.

In reference to FIG. 1, an aircraft propulsion assembly comprises a turbojet engine 2 nacelle 1 suspended under a wing (not shown) using an island 3 designed to serve as an interface with a mast or pylon (not shown).

This nacelle 1 is traditionally subdivided into an upstream air intake section, a middle section surrounding a fan (not shown) of the turbojet engine 2 and its case, and a downstream section housing a thrust reversal device 20 and, optionally, an end nozzle section.

The illustrated nacelle has a so-called "O" downstream section.

As illustrated in FIGS. 3 and 4, the thrust reverser means 20 can assume the form of a cowl 21 that can be translated longitudinally in the downstream direction of the nacelle 1 so as to free an opening in the outer downstream structure of the nacelle 1 and expose cascade vanes 22 capable of reorienting part of the secondary flow of air generated by the turbojet engine toward the front of the nacelle 1 through the opening thus freed.

In FIG. 3, the thrust reversal device 20 is in the closed position. In that case, the cowl 21 ensures the outer aerodynamic continuity of the nacelle 1 with the middle section of the nacelle and covers the cascade vanes 22.

In FIG. 1, however, the thrust reversal device 20 is shown in the deployed position, i.e., the outer cowl 21 of the downstream section is withdrawn toward the downstream direction of the nacelle 1 so as to free the opening in the outer structure of the nacelle 1 and expose the cascade vanes 22 toward the front of the nacelle 1 through the opening thus freed.

In one alternative form illustrated in particular in FIGS. 3 and 4, reverser flaps 23 ensure the inner aerodynamic continuity of the downstream section with the middle section. When the reverser 20 is activated, reverser flaps 23 pivot to at least partially obstruct the circulation tunnel for the secondary flow and help its reorientation through the cascade vanes 22 and the opening freed in the outer downstream structure of the nacelle 1.

These reverser flaps 23 are not always necessary.

In particular, in certain configurations, the withdrawal of the cowl 21 is sufficient to obstruct the tunnel.

The reverser 20 is traditionally activated by at least one actuator of a cylinder type 24 capable of translating the cowl 21.

Furthermore, the thrust reversal device 20 comprises at least one fixed front frame 25 closing the thickness of the nacelle 1 upstream of the cowl 21 and directly or indirectly supporting at least the cascade vanes 22.

In one non-limiting alternative form illustrated in FIG. 7, the front frame 25 comprises a front panel 251 designed to support the outer skin of the nacelle, fastened to a torsion box 253.

In the provided example, the shape of the back of the torsion box 253 performs the deviating edge aerodynamic function.

An outer ring 255 allows the torsion box 253 and the cascade vanes 22 to be attached.

In another alternative form illustrated in FIG. 8, the front frame 25 can be made using radial ribs 252 instead of a torsion box 253 to stiffen the structure.

These ribs 252 are placed in the concavity of an element 253 forming a deviating edge of the front frame 25 so as to ensure the aerodynamic line of the front frame 25.

Figure 2:
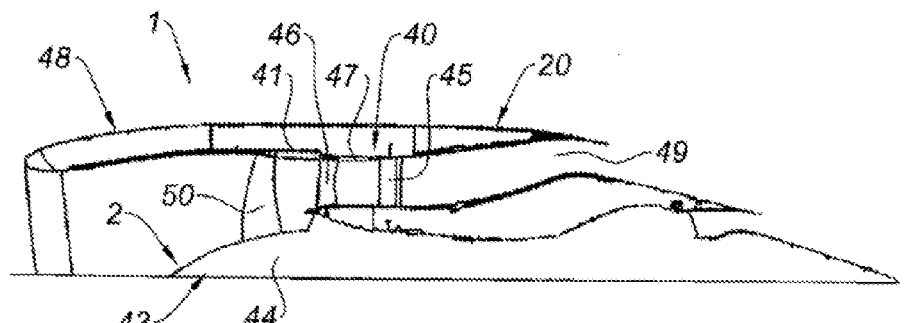
FIG. 2 is a partial cross-sectional illustration of an aircraft propulsion assembly.

In reference to FIGS. 2 to 4 in particular, the upstream end of the front frame 25 is connected to an intermediate case 40 belonging to the middle section of the nacelle 1.

The upstream end of this intermediate case 40 is connected to an outer fan case 41, which channels the secondary flow delivered by the turbojet engine fan 2 provided with vanes 50, designated by general reference 43, in the downstream direction.

This flow also passes through the wheel formed by the intermediate case 40.

The fan 43 is rotatably mounted on a fixed hub 44 connected to the fan case 41 by a plurality of fixed arms 45 that can transmit part of the forces between the engine 2 and its support.

Upstream of these fixed arms 45, between the rotor of the fan 43 and the arms 45, are outlet guide vanes (OGV) 46, which make it possible to guide the secondary flow created by the fan 43, and optionally to transmit the forces to the fan case 41.

The intermediate case 40 is a structural element that comprises a hub 44, an annular outer shroud 47 that supports the shroud of the fan case 41, and the radial connecting arms 45 that connect the hub 44 to the outer shroud 47.

It may have a structural function inasmuch as the forces are transmitted using it; in particular, the means, if they are attached on that case, for fastening the engine to the structure of the aircraft in the front portion are secured to the intermediate case 40.

This intermediate case 40 may either be made in a one single piece, or maybe a welded or bolted assembly of primary parts.

In a first form of the fixed front frame 25, the front frame 25 is connected to the outer shroud 47 of the intermediate case 40 by connecting means of the blade/groove type.

In a second form of the fixed front frame 25, illustrated in FIGS. 3 to 6, the intermediate case 40 incorporates, in the downstream portion thereof and, more specifically, downstream of the outer shroud 47, the deviating edge 257 and the elements forming a support for the cascade vanes 22.

"Incorporated" means that the connection between the outer shroud 47 of the intermediate case 40 and the front frame 25 is a complete non-disassemblable connection, i.e., any mobility between the front frame 25 and the shroud 47 is eliminated.

This non-disassemblable connection between the front frame 25 and the shroud 47 may be of the riveting, gluing, forced fitting, or welding type in non-limiting examples of the present disclosure.

The support-forming elements of the cascade vanes may be the outer ring 255 and the torsion box 253.

Furthermore, in reference to FIGS. 3 to 6, the actuating cylinder(s) 24 of the cowl 21 and the cascade vanes 22 are supported on the assembly formed by the front from 25 and the outer shroud 47 of the intermediate case 40.

According to the disclosure, at least one part of the cascade vanes 22 is detachable from the fixed front frame 25 and translatable independently thereof during a maintenance operation of the reverser 20.

The cascade vanes 22 are capable of being detachably connected to the front frame 25 by locking/unlocking means that allow the disengagement of said vanes 22 from the front frame 25 and the middle section, and the downstream translation thereof independently of the front frame 25.

Thus, the fixed front frame 25 and the removable cascade vanes 22 are attached in an operating configuration of the reverser, in the reverse jet phase when the cowl 21 slides in the downstream direction of the nacelle 1 and the reverser flaps 23 obstruct the tunnel 49, as illustrated in FIG. 5, and in flight phases.

They may be separated, during a maintenance operation, to allow translation of the cascade vanes 22 with the cowl 21 in the downstream direction of the nacelle 1 into a maintenance configuration in which access is thus opened to the engine and the inner structure of the reverser 20, as illustrated in FIG. 6.

Thus, in said FIG. 6, one can see that the assembly of the front frame 25 and the intermediate case 40 forms a fixed assembly that cannot be moved in a maintenance position, while the cascade vanes 22 and the cowl 21 form a unitary movable assembly that can be moved in that maintenance position.

The locking/unlocking means 30 between the cascade vanes 22 and the front frame 25 may be of any type.

In one alternative form, the locking/unlocking means 30 comprises at least one pair of male 31 and female 32 connectors, once secured to the front frame 25/outer shroud 47 assembly and the other to the cascade vanes 22.

The connectors are arranged such that they cooperate during flight phases and reverse jet phases (see FIGS. 3 to 5), securing the cascade vanes 22 with the front frame 25/outer shroud 47 assembly of the case 40, and detached during the maintenance operations illustrated in FIG. 6 to translate the assembly formed by the cowl 21 and the cascade vanes 22.

Furthermore, regarding the connection between the fixed front frame 25 and the outer shroud 47 of the intermediate case 40, in a first alternative embodiment, the outer shroud 47, the torsion box 253 or the deviating edge assembly with its ribs 252 of the front frame 25 are formed in a single piece.

In a second alternative form, the entire front frame 25 is incorporated into the outer shroud 47 of the intermediate case 40, and may or may not be in a single piece.

In a third alternative form, the fan case 41, alone or with the inner shroud of the air intake structure 48, is incorporated into the outer shroud 47 of the intermediate case 40.

In a fourth alternative form, the outlet guide vanes 46 and/or the hub 44 and/or the connecting arms and the engine suspension yokes, if they are situated on the outer shroud 47 of the intermediate case 40, are incorporated into the assembly of the outer shroud 47 of the intermediate case 40 and the front frame 25.

In a fifth alternative form, the members mentioned in the third and fourth alternatives are made up of a single structural element.

Furthermore, the outer shroud 47 of the intermediate case 40 and/or the front frame 25 maybe made from a composite material.

The composite material may be chosen from among materials with a base of carbon fibers, glass fibers, aramid fibers, or a mixture of those materials with a resin.

This composite material may be obtained by draping pre-impregnated fabrics or using a Liquid Composite Molding (LCM) method, in which the resin is mixed with dry carbon fabrics or a woven or braided preform, if applicable.

Still in another form, the set of the aforementioned members incorporated into the outer shroud 47 of the intermediate case, i.e., all of the front frame 25, the hub 44, the OGV 46 and the engine suspension yokes, are formed by a single structural element, for example made from a composite material.

This makes it possible to obtain a multifunctional part with an overall weight that is much lower than all of the parts it replaces, and not requiring any assembly operation. There are gains in terms of structural simplicity and mass.

Furthermore, it is no longer necessary to have fasteners at the deviating edge 257 of the front frame 25, with the result that aerodynamic pressure losses are decreased.

The thrust reverser 20 illustrated in FIGS. 3 to 6 is implemented as follows.

During thrust reversal, illustrated in FIG. 5, the cowl 21 moves from a closed position, where it ensures the aerodynamic continuity with the middle section of the nacelle 1, to an open position downstream of the nacelle 1, so as to expose the cascade vanes 22 to deviate part of the secondary airflow through said cascade vanes 22.

Furthermore, the reverser flaps 23 also move during the travel of the cowl 21 and deploy in the cold flow tunnel 49.

During a maintenance operation illustrated in FIG. 6, one first disengages the locking means 30 between the front frame 25/outer shroud 47 of the intermediate case 40 and the cascade vanes 22.

In reference to FIGS. 5 to 6, once these elements are detached, an assembly formed by the cowl 21 and the cascade vanes 22 can be translated in the downstream direction of the nacelle 2 from the closed position of the cowl 21 to a maintenance position, either using actuating cylinders 24 of the cowl 21 or using any other suitable means.

The front frame 25/outer shroud 47 assembly of the intermediate case 40 remains stationary during the movement.

In a first alternative form, the same is true for the actuating cylinders, which remain stationary.

However, in a second alternative form, the cylinders 24 maybe translatable to the maintenance position, and thus move simultaneously with the cowl 21 and the cascade vanes 22.

The movement of the cylinders 24 offers the advantage of not hindering access to the engine of the turbojet 2.

Once the various movements are completed, an opening is then freed, which allows any person in particular to access the inner fixed structure of the nacelle 1 or the body of the engine.

It should be noted that the aforementioned maintenance position of the cowl 21 may correspond to the reverse jet position of the cowl 21 or a position downstream of the reverse jet position of the cowl 21.

In the latter case, additional withdrawal of the cowl 21 maybe made possible by over-travel of the cylinders 24 or by suitable means for disconnecting the cylinders 24 from the cowl and sliding the cowl 21 using any suitable means.

Although the disclosure has been described with specific examples of embodiments, it is of course in no way limited thereto and on the contrary encompasses all technical equivalents of the described means, as well as combinations thereof, if they are within the scope of the disclosure. Variations that do not depart from the substance of the disclosure are not to be regarded as a departure from the spirit and scope of the disclosure.

What is claimed is:

1. A thrust reverser for a turbojet engine nacelle comprising:
   at least one fixed front frame mounted downstream of a fan case of a turbojet engine and directly or indirectly supporting at least one flow deviating means;
   an outer cowl translatably mounted along a longitudinal axis of the turbojet engine nacelle,
   wherein the flow deviating means and the front frame comprise complementary locking/unlocking means configured to engage the flow deviating means with the front frame in a reverse jet situation and to detach the flow deviating means from the front frame during a maintenance operation of said thrust reverser,
   wherein said outer cowl is configured to translate the flow deviating means during the maintenance operation once the flow deviating means are detached.

2. The thrust reverser according to claim 1, further comprising at least one actuator translating the outer cowl along the longitudinal axis of the turbojet engine nacelle downstream of the front frame toward at least one thrust reversal position, said cowl being suitable for translating one or more actuators during the maintenance operation.

3. The thrust reverser according to claim 1, wherein the fixed front frame is mounted downstream of an outer shroud of an intermediate case using a male/female system of a blade/groove type.

4. The thrust reverser according to claim 1, wherein the fixed front frame is mounted downstream of an outer shroud of an intermediate case, said front frame comprising a deviating edge and a supporting-forming element directly or indirectly forming a support for the flow deviating means, the deviating edge and said support-forming element being incorporated into the outer shroud of the intermediate case.

5. A nacelle comprising a thrust reverser according to claim 1.

6. A method for maintaining a thrust reverser for a turbojet engine nacelle, said turbojet engine nacelle comprising at least one fixed front frame suitable for being mounted downstream of a fan case of said turbojet engine and directly or indirectly supporting at least one flow deviating means, said turbojet engine nacelle further comprising an outer cowl translatably mounted along a longitudinal axis of the turbojet engine nacelle, wherein said flow deviating means and the front frame comprise complementary locking/unlocking means suitable for engaging the flow deviating means with the front frame, said method comprising following steps:
   when the outer cowl is in a closed position, connecting the deviating means to the outer cowl so as to form a unitary movable assembly;
   detaching said flow deviating means from the front frame by unlocking the locking/unlocking means; and
   translating in a downstream direction of the turbojet engine nacelle said outer cowl from the closed position to a maintenance position so as to translate the flow deviating means with said outer cowl.

* * * * *